(12) United States Patent
Eguchi et al.

(10) Patent No.: US 8,622,691 B2
(45) Date of Patent: Jan. 7, 2014

(54) SUPERCHARGER

(75) Inventors: Masatoshi Eguchi, Tokyo (JP);
Kazuhiro Onitsuka, Tokyo (JP);
Masahiro Shimizu, Tokyo (JP)

(73) Assignee: IHI Corporation, Tokyo (JP)

( * ) Notice: Subject to any disclaimer, the term of this patent is extended or adjusted under 35 U.S.C. 154(b) by 739 days.

(21) Appl. No.: 12/864,837

(22) PCT Filed: Jan. 28, 2008

(86) PCT No.: PCT/JP2008/051198
§ 371 (c)(1),
(2), (4) Date: Jul. 27, 2010

(87) PCT Pub. No.: WO2009/095985
PCT Pub. Date: Aug. 6, 2009

(65) Prior Publication Data
US 2010/0310366 A1   Dec. 9, 2010

(51) Int. Cl.
*F02B 39/14*   (2006.01)
(52) U.S. Cl.
USPC ......... 415/106; 384/107; 415/174.2; 415/229
(58) Field of Classification Search
USPC .............. 384/107; 415/104, 106, 140, 174.2, 415/174.3, 229
See application file for complete search history.

(56) References Cited

U.S. PATENT DOCUMENTS

| | | | |
|---|---|---|---|
| 2,588,459 A | | 3/1952 | Annen |
| 2,918,207 A | | 12/1959 | Moore |
| 3,043,636 A | * | 7/1962 | MacInnes et al. ............ 384/287 |
| 3,180,568 A | * | 4/1965 | Oettle ........................ 415/175 |

(Continued)

FOREIGN PATENT DOCUMENTS

| | | |
|---|---|---|
| JP | 58-152527 A | 10/1983 |
| JP | 60-52352 | 4/1985 |

(Continued)

OTHER PUBLICATIONS

Office Action issued in Korean Patent Application No. 10-2008-7028778, dated Feb. 28, 2011, and its english translation, of co-pending U.S. Appl. No. 12/300,726.

(Continued)

*Primary Examiner* — Nathaniel Wiehe
*Assistant Examiner* — Woody A Lee, Jr.
(74) *Attorney, Agent, or Firm* — Griffin & Szipl, P.C.

(57) ABSTRACT

The invention provides a supercharger which is provided with a thrust bearing in an outer side of a radial bearing, and can smoothly discharge a fed lubricating oil from a bearing portion so as to reduce a resistance generated by the lubricating oil.

The supercharger is provided with a thrust bearing (30) rotatably supporting a thrust force applied to a turbine shaft (12). The thrust bearing (30) is constituted by a disc-shaped thrust collar (32) rotating together with the turbine shaft, and a turbine side thrust bearing (34) and a compressor side thrust bearing (36) inhibiting a movement in an axial direction of the thrust collar. The compressor side thrust bearing (36) has an oil feed flow path (36*a*) feeding a lubricating oil to a surface coming into contact with a thrust collar from an inner side of a housing, an annular concave groove (36*b*) provided in an inner surface of a hollow through hole through which the turbine shaft passes, and an oil discharge flow path (36*c*) dropping down the lubricating oil reserved within the concave groove downward.

3 Claims, 5 Drawing Sheets

(56) References Cited

U.S. PATENT DOCUMENTS

| | | | |
|---|---|---|---|
| 3,612,628 A | 10/1971 | Steele | |
| 3,632,222 A | 1/1972 | Cronstedt | |
| 3,728,857 A | 4/1973 | Nichols | |
| 3,811,741 A | 5/1974 | McInerney et al. | |
| 3,890,780 A | 6/1975 | Hagemeister et al. | |
| 4,061,279 A | 12/1977 | Sautter | |
| 4,157,834 A * | 6/1979 | Burdette | 277/306 |
| 4,253,031 A | 2/1981 | Frister | |
| 4,364,717 A * | 12/1982 | Schippers et al. | 417/407 |
| 4,392,752 A * | 7/1983 | Shimizu et al. | 384/135 |
| 4,872,817 A | 10/1989 | DeKruif | |
| 4,883,370 A | 11/1989 | Nakanishi | |
| 5,121,605 A | 6/1992 | Oda et al. | |
| 5,243,880 A | 9/1993 | Beier et al. | |
| 5,605,045 A | 2/1997 | Halimi et al. | |
| 5,857,332 A | 1/1999 | Johnston et al. | |
| 6,032,466 A | 3/2000 | Woollenweber et al. | |
| 6,126,414 A * | 10/2000 | Koike | 417/407 |
| 6,145,314 A | 11/2000 | Woollenweber et al. | |
| 6,253,747 B1 | 7/2001 | Sell et al. | |
| 6,449,950 B1 | 9/2002 | Allen et al. | |
| 6,753,628 B1 | 6/2004 | Neal | |
| 6,845,617 B1 | 1/2005 | Allen et al. | |
| 6,871,499 B1 | 3/2005 | Allen et al. | |
| 7,360,361 B2 | 4/2008 | Prusinski et al. | |
| 7,458,214 B2 | 12/2008 | Philippe | |
| 7,670,056 B2 | 3/2010 | Petitjean et al. | |
| 7,753,591 B2 | 7/2010 | Petitjean et al. | |
| 7,765,846 B2 | 8/2010 | Stueckrad et al. | |
| 2003/0017879 A1 | 1/2003 | Tsay et al. | |
| 2004/0229703 A1 | 11/2004 | Jackson et al. | |
| 2005/0082941 A1 | 4/2005 | Iida et al. | |
| 2006/0123783 A1 | 6/2006 | Philippe | |
| 2006/0225419 A1 | 10/2006 | Prusinski et al. | |
| 2007/0108772 A1 | 5/2007 | Shibui et al. | |
| 2008/0087018 A1 | 4/2008 | Woollenweber | |
| 2009/0025386 A1 | 1/2009 | Rumsby | |
| 2010/0132358 A1 | 6/2010 | Purdey et al. | |
| 2010/0175377 A1 | 7/2010 | Hippen et al. | |
| 2010/0266430 A1 | 10/2010 | Shimizu | |
| 2011/0124421 A1 | 5/2011 | Kienhofer et al. | |

FOREIGN PATENT DOCUMENTS

| | | |
|---|---|---|
| JP | 60-153826 | 10/1985 |
| JP | 61-237830 A | 10/1986 |
| JP | H05026202 | 4/1993 |
| JP | 06-042361 | 2/1994 |
| JP | 07-174029 A | 7/1995 |
| JP | H12-145468 | 5/2000 |
| JP | 2002-54448 A | 2/2002 |
| JP | 10 2004 0089337 | 10/2004 |
| JP | 2007-297973 A | 11/2007 |
| JP | 2007-321698 A | 12/2007 |
| JP | 2007-321699 A | 12/2007 |
| JP | 2008-31949 A | 2/2008 |
| JP | 2009-243361 A | 10/2009 |
| JP | 2009-243365 A | 10/2009 |
| JP | 2010-121589 A | 6/2010 |
| KR | 10 2004 0105849 A | 12/2004 |

OTHER PUBLICATIONS

Office Action issued in co-pending U.S. Appl. No. 12/300,726, dated May 2, 2011.
Notice of Allowance issued in co-pending U.S. Appl. No. 12/300,746, dated Apr. 19, 2011.
International Search Report issued in corresponding application PCT/JP2008/051198, completed Feb. 8, 2008, mailed Feb. 19, 2008.
Office Action mailed Aug. 23, 2011 in co-pending U.S. Appl. No. 12/280,816.
Office Action mailed Jul. 12, 2011 in co-pending U.S. Appl. No. 12/377,987.
Patent Abstracts of Japan English Abstract corresponding to the Hattori Document JP61-237830, a filed in a related application as "Exhibit A".
Espacenet English Abstract corresponding to the Hwang Document KR20040089337, filed in a related application as "Exhibit B".
Machine English Translation of the Hwang Document KR20040089337, obtained from the Korean Patent Office, filed in a related application as "Exhibit C,".
Machine translation of JP2000-145468.
Office Action mailed Jul. 7, 2011 in co-pending U.S. Appl. No. 12/377,977.
Office Action issued Oct. 11, 2011 in related Korean Patent Application No. 10-2009-7002939 and its English translation.
Office Action issued Oct. 11, 2011 in related Korean Patent Application No. 10-2009-7002938 and its English translation.
Office Action issued Nov. 1, 2011 in related Korean Patent Application No. 10-2009-7021399 and its English translation.
Office Action issued in corresponding Japanese Patent Application No. 2006-207973, dated Jan. 11, 2011 with an english translation.
http://encyclopedia2.thefreedictionary.com/friction+fit, downloaded Mar. 9, 2011, 2 pgs.
http://answers.yahoo.com/question/index?qid=20100220052035A, dated Feb. 20, 2010, downloaded Mar. 9, 2011, 1 page.
http://www.answers.com/topic/friction-fit, downloaded Mar. 9, 2011, 1 page.
http://www.roymech.co.uk/Useful_Tables/ISO_Tolerances/ISO, downloaded Mar. 9, 2011, 2 pgs.
Office Action issued in co-pending U.S. Appl. No. 12/300,726, dated Dec. 21, 2010.
Office Action issued in co-pending U.S. Appl. No. 12/300,746, dated Dec. 22, 2010.

\* cited by examiner

SUPERCHARGER

This is a National Phase Application in the United States of International Patent Application No. PCT/JP2008/051198 filed Jan. 28, 2008. The entire disclosure of the above patent application is hereby incorporated by reference.

BACKGROUND OF THE INVENTION

The present invention relates to a supercharger.

To feed an air having a density increased by a compressor to an engine is called as supercharging, and a structure providing for a driving work of the compressor by an exhaust gas is called particularly as an exhaust-gas turbocharger.

The exhaust-gas turbocharger is constituted by a compressor and a turbine which are arranged while holding a bearing unit therebetween. The compressor has a compressor impeller built-in, and the turbine has a turbine impeller built-in, respectively. The compressor impeller and the turbine impeller are coupled to each other by a coupling shaft supported by the bearing unit, and are structured such that the turbine impeller is rotationally driven by an exhaust gas of the engine, a rotating force is transmitted to the compressor impeller via the coupling shaft, and the air is compressed by the compressor impeller so as to be supercharged to the engine.

Patent Documents 1 and 2 are disclosed as a bearing of an exhaust-gas turbocharger and an oil feeding means.

A bearing apparatus of in Patent Document 1 is provided with an oil reserving space 74 at a position corresponding to an outer periphery of thrust bearings 72 and 73 of a bearing case 71, and is provided with an oil draining passage 77 at each of two right and left positions communicating the space 74, a bearing table 75 and an oil draining port 76, as shown in FIGS. 1A and 1B.

A supercharger in Patent Document 2 is a supercharger having a turbine shaft 81, a radial bearing 82, a stepped portion 83 and an oil drain 84, in which a distance L from a side wall surface of the radial bearing to the stepped portion is set to such a distance that an oil moving from an end portion of the radial bearing comes into non-contact with the stepped portion in a region in which a turbine rotating speed becomes higher than a turbine rotating speed at a time of an idling operation of the engine, as shown in FIG. 2.

Patent Document 1: Japanese Unexamined Patent Publication No. 60-52352 "BEARING APPARATUS OF EXHAUST-GAS TURBOCHARGER"

Patent Document 2: Japanese Unexamined Patent Publication No. 2002-54448 "EXHAUST-GAS TURBOCHARGER AND SUPERCHARGING SYSTEM FOR INTERNAL COMBUSTION ENGINE"

In the exhaust-gas turbocharger, since a pressure applied to a turbine impeller is generally higher than a pressure applied to a compressor impeller, a large thrust force is generated in a direction heading for the compressor impeller.

Accordingly, it is necessary to feed a sufficient amount of lubricating oil to the thrust bearing supporting a rotating shaft of the exhaust-gas turbocharger.

However, in the case that the thrust bearing is provided in a compressor side outer side of the radial bearing, the fed lubricating oil is hard to be discharged from the bearing portion because a lubricating oil flow path in the compressor side is complicated. Accordingly, there is a risk that a resistance generated by the lubricating oil is increased.

SUMMARY OF THE INVENTION

The present invention is made for solving the problem mentioned above. In other words, an object of the present invention is to provide a supercharger which can smoothly discharge a fed lubricating oil from a bearing portion so as to reduce a resistance generated by the lubricating oil, even in the case that a thrust bearing is provided in a compressor side outer side of a radial bearing.

In accordance with the present invention, there is provided a supercharger comprising:

a turbine shaft having a turbine impeller in one end; and a compressor impeller rotationally driven by the turbine shaft, wherein the supercharger is provided with a thrust bearing rotatably supporting a thrust force applied to the turbine shaft, wherein the thrust bearing is constituted by a disc-shaped thrust collar rotating together with the turbine shaft, and a turbine side thrust bearing and a compressor side thrust bearing inhibiting a movement in an axial direction of the thrust collar, and wherein the compressor side thrust bearing has an oil feed flow path feeding a lubricating oil to a surface coming into contact with a thrust collar from an inner side of a housing, an annular concave groove provided in an inner surface of a hollow through hole through which the turbine shaft passes, and an oil discharge flow path dropping down the lubricating oil reserved within the concave groove downward.

In accordance with a preferable embodiment of the present invention, the supercharger has a fixed partition wall comparting between the compressor side thrust bearing and the compressor impeller, and an oil shield member positioned between the fixed partition wall and the compressor side thrust bearing and rotating together with the turbine shaft, and a seal member sealing in a liquid tight manner between the oil shield member and the fixed partition wall, and the oil shield member has a vertical surface which is larger than the hollow through hole of the compressor side thrust bearing, and is approximately orthogonal to the turbine shaft.

In accordance with the structure of the present invention mentioned above, since the thrust bearing is constituted by the disc-shaped thrust collar rotating together with the turbine shaft, the turbine side thrust bearing and the compressor side thrust bearing, it is possible to grip the thrust collar by the turbine side thrust bearing and the compressor side thrust bearing, and it is possible to rotatably support the thrust force in both directions applied to the turbine shaft.

Further, since the compressor side thrust bearing has the oil feed flow path feeding the lubricating oil to the surface coming into contact with the thrust collar from the inner side of the housing, it is possible to support the large thrust force in the direction heading for the compressor impeller by the lubricating oil interposing between the compressor side thrust bearing and the thrust collar with a low resistance and securely, by feeding a sufficient amount of lubricating oil from the oil feed flow path.

Further, since the compressor side thrust bearing has the annular concave groove provided in the inner surface of the hollow through hole through which the turbine shaft passes, and the oil discharge flow path dropping down the lubricating oil reserved within the concave groove downward, it is possible to capture the lubricating oil which is going to flow out to the compressor side from the gap between the inner surface of the hollow through hole and the turbine shaft by the annular concave groove, and it is possible to smoothly drop down the lubricating oil reserved there downward through the oil discharge flow path.

Therefore, in accordance with the present invention, even in the case that the thrust bearing is provided in the compressor side outer side of the radial bearing, it is possible to reduce the resistance generated by the lubricating oil by smoothly discharging the fed lubricating oil from the bearing portion, it is possible to secure a performance of a seal, and it is possible to increase a reliability of a whole of the supercharger.

DESCRIPTION OF THE PREFERRED EMBODIMENT

Figure 1A:
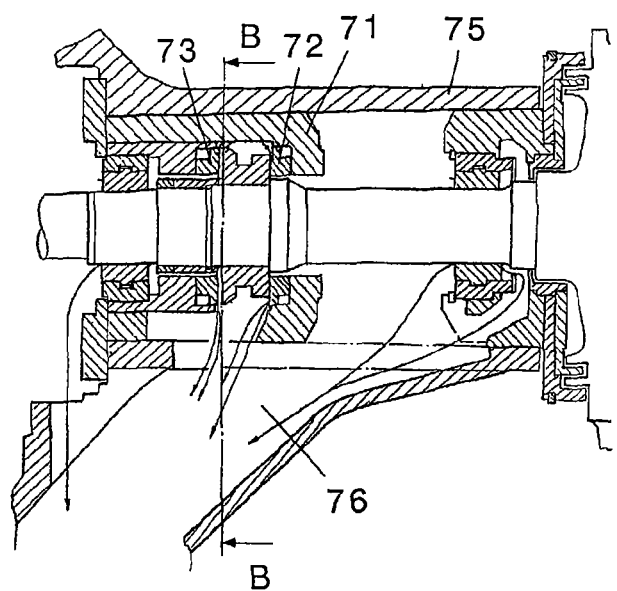
FIG. 1A is a vertical cross sectional view of a bearing apparatus in Patent Document 1.
Figure 1B:
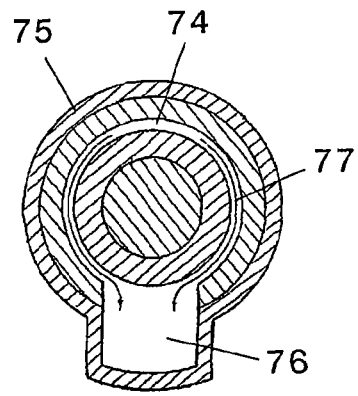
FIG. 1B is a cross sectional view along a line B-B in FIG. 1A.
Figure 2:
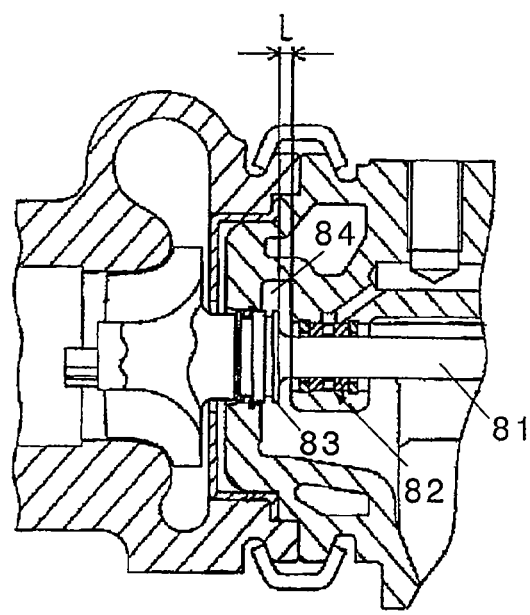
FIG. 2 is a schematic view of a supercharger in Patent Document 2.

A description will be given below of a preferable embodiment in accordance with the present invention with reference to the accompanying drawings. In this case, in each of the drawings, the same reference numerals are attached to common portions, and an overlapping description will be omitted.

Figure 3:
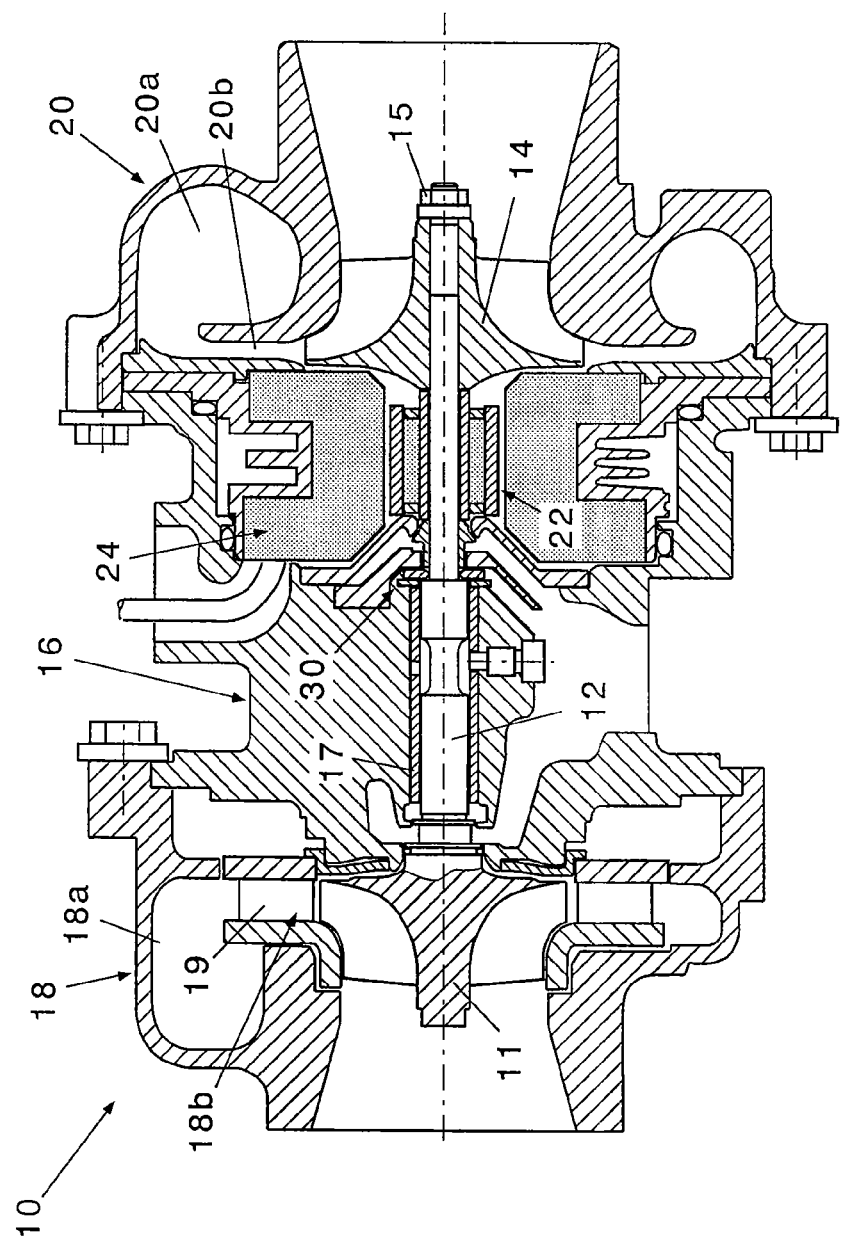
FIG. 3 is a schematic view of a whole structure of a supercharger in accordance with the present invention.

FIG. 3 is a schematic view of a whole structure of a supercharger in accordance with the present invention. In this drawing, a supercharger 10 in accordance with the present invention is provided with a turbine shaft 12, a compressor impeller 14, and a housing. The housing is constituted by a bearing housing 16, a turbine housing 18 and a compressor housing 20, in this embodiment.

The turbine shaft 12 has a turbine impeller 11 in one end (a left end in the drawing). In this embodiment, the turbine impeller 11 is formed integrally in the turbine shaft 12, however, the present invention is not limited to this, but may be structured such that the turbine impeller 11 is independently attached.

The compressor impeller 14 is coupled to the other end (a right end in the drawing) of the turbine shaft 12 so as to be integrally rotated by a shaft end nut 15.

The bearing housing 16 rotatably supports the turbine shaft 12 by a radial bearing 17. Further, the turbine shaft 12 is supported by a thrust bearing 30 in such a manner as to be prevented from moving in an axial direction.

The turbine housing 18 rotatably surrounds the turbine impeller 11, and is coupled to the bearing housing 16. The turbine housing 18 has a scroll chamber 18a in which an exhaust gas is introduced to an inner portion from an external portion, and a flow path 18b formed as an annular shape so as to guide the exhaust gas from the scroll chamber 18a to the turbine impeller 11.

Further, a plurality of nozzle blades 19 are arranged in the flow path 18b at a fixed interval in a circumferential direction. The nozzle blade 19 is constituted by a variable nozzle blade, and is preferably structured such as to be capable of changing a flow path area formed between the nozzle blades, however, the present invention is not limited to this, but a fixed nozzle blade may be employed.

Further, the flow path 18b may be provided with not nozzle blade 19.

The compressor housing 20 rotatably surrounds the compressor impeller 14, and is coupled to the bearing housing 16. The compressor housing 20 has a scroll chamber 20a in which a compressed air is introduced to an inner portion, and a flow path 20b formed as an annular shape so as to guide the compressed air from the compressor impeller 14 to the scroll chamber 20a.

In accordance with the structure mentioned above, it is possible to rotationally drive the turbine impeller 11 by the exhaust gas of the engine, it is possible to transmit the rotating force to the compressor impeller 14 via the turbine shaft 12, and it is possible to compress the air by the compressor impeller 14 so as to supercharge to the engine.

The embodiment in FIG. 3 is provided with a motor rotor 22 and a motor stator 24 for assisting an acceleration of the supercharger. The motor rotor 22 is constituted by a rotor of an electric motor, and the motor stator 24 is constituted by a stator of the electric motor. A brushless ac motor is constructed by the motor rotor 22 and the motor stator 24.

The motor rotor 22 is preferably fixed to the turbine shaft 12.

In this case, the electric motor for assisting the acceleration of the supercharger is not always necessary in the present invention, and the motor rotor 22 and the motor stator 24 may not be provided.

Figure 4:
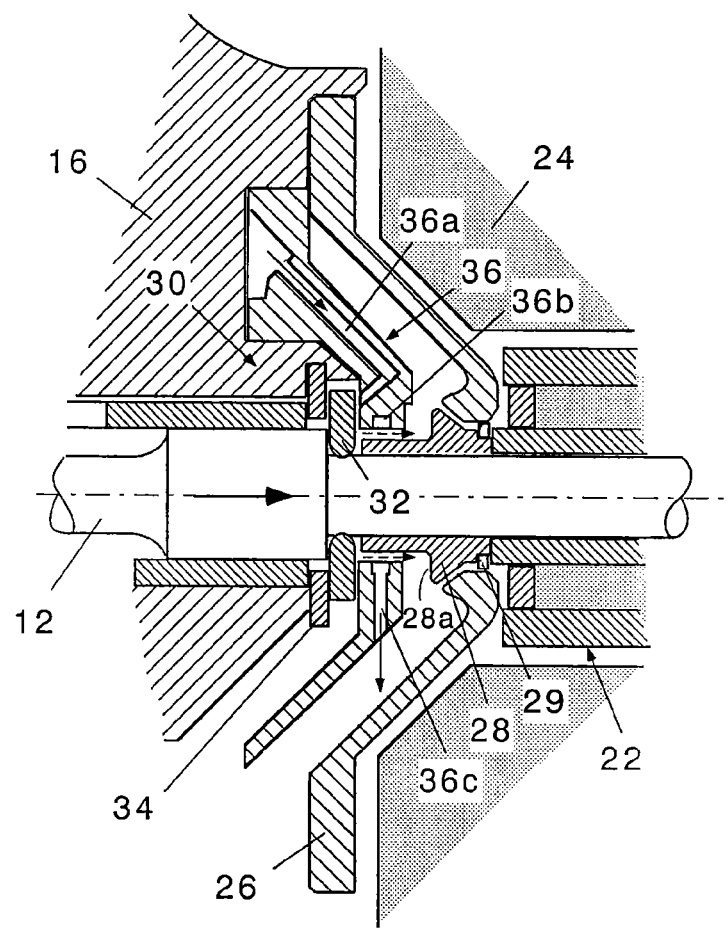
FIG. 4 is a partly enlarged view of FIG. 3.

FIG. 4 is a partly enlarged view of FIG. 3.

As shown in this drawing, the thrust bearing 30 is constituted by a disc-shaped thrust collar 32 rotating together with the turbine shaft 12, and a turbine side thrust bearing 34 and a compressor side thrust bearing 36 inhibiting a movement in an axial direction of the thrust collar 32.

The compressor side thrust bearing 36 has an oil feed flow path 36a, an annular concave groove 36b and an oil discharge flow path 36c.

The oil feed flow path 36a has a function of feeding the lubricating oil to a surface (a left surface of the drawing) coming into contact with the thrust collar 32 from an inner side of the bearing housing 16.

Further, the annular concave groove 36b is provided in an inner surface of a hollow through hole through which the turbine shaft 12 passes.

Further, the oil discharge flow path 36c has a function of dropping down the lubricating oil reserved within the annular concave groove 36b downward. The oil discharge flow path 36c is provided approximately vertically toward a downward side in this embodiment. However, since the lubricating oil reserved in the annular groove portion 36b is also rotated in accordance with the rotation of the turbine shaft, it is effective that the oil discharge flow path 36c is provided diagonally for easily dropping downward on the basis of the rotating force.

Figure 5:
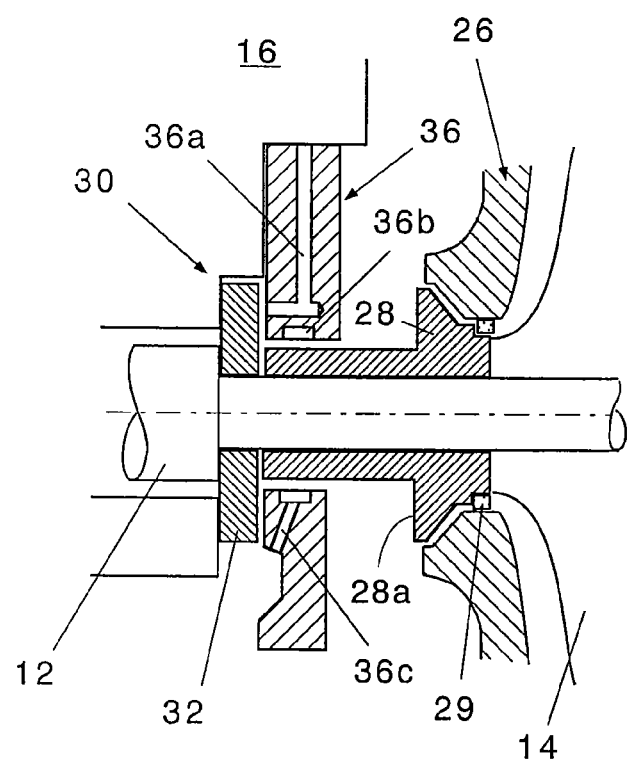
FIG. 5 is a view of the other embodiment in accordance with the present invention.

FIG. 5 is a view of the other embodiment in accordance with the present invention in the same manner as FIG. 4.

In this drawing, the thrust bearing 30 is constituted by the disc-shaped thrust collar 32 rotating together with the turbine shaft 12, and the turbine side thrust bearing (not shown) and the compressor side thrust bearing 36 inhibiting the movement in the axial direction of the thrust collar 32.

A shape of the compressor side thrust bearing 36 is flat in this drawing.

Further, the compressor side thrust bearing 36 has the oil feed flow path 36a, the annular concave groove 36b and the oil discharge flow path 36c which are the same as FIG. 4. The oil discharge flow path 36c is provided diagonally toward a downward side in this embodiment.

FIG. 5 is different from the structure of FIG. 4 in a point that the motor rotor 22 and the motor stator 24 are not provided, however, is identical to FIG. 4 in the other structures.

In accordance with the structure of the present invention mentioned above, since the thrust bearing 30 is constituted by the disc-shaped thrust collar 32 rotating together with the turbine shaft, the turbine side thrust bearing 34 and the compressor side thrust bearing 36, it is possible to rotatably support the thrust force in both directions applied to the turbine shaft 12 by gripping the thrust collar 32 by the turbine side thrust bearing 34 and the compressor side thrust bearing 36 in the axial direction.

Further, since the compressor side thrust bearing 36 has the oil feed flow path 36*a* feeding the lubricating oil to the surface coming into contact with the thrust collar 32 from the inner side of the housing, it is possible to support the great thrust force in the direction heading for the compressor impeller by the lubricating oil interposing between the compressor side thrust bearing 36 and the thrust collar 32 at a low resistance and securely, by feeding a sufficient amount of lubricating oil from the oil feed flow path 36*a*.

Further, since the compressor side thrust bearing 36 has the annular concave groove 36*b* provided in the inner surface of the hollow through hole through which the turbine shaft 12 passes, and the oil discharge flow path 36*c* dropping the lubricating oil reserved within the concave groove 36*b* downward, it is possible to capture the lubricating oil which is going to flow out to the compressor side from the gap between the inner surface of the hollow through hole and the turbine shaft, and it is possible to smoothly drop down the lubricating oil reserved there downward through the oil discharge flow path 36*c*.

The supercharger in accordance with the present invention has a fixed partition wall 26, an oil shield member 28 and a seal member 29.

The fixed partition wall 26 is fixed to the bearing housing 16 in this embodiment, and corresponds to a partition wall comparting the compressor side thrust bearing 36 and the compressor impeller.

The oil shield member 28 is positioned between the fixed partition wall 26 and the compressor side thrust bearing 36, is fixed to the turbine shaft 12, and is rotated together with the turbine shaft 12. The oil shield member 28 is larger than the hollow through hole of the compressor side thrust bearing 36, and has a vertical surface 28*a* which is approximately orthogonal to the turbine shaft 12.

The seal member 29 seals in a liquid tight manner between the oil shield member 28 and the fixed partition wall 26.

In accordance with this structure, it is possible to make the lubricating oil flowing to the compressor side while getting over the annular concave groove 36*b* without being captured by the annular concave groove 36*b* and reaching the vertical surface 28*a* of the oil shield member 28 fly away outward in a radial direction on the basis of a centrifugal force generated by a high speed rotation of the oil shield member 28.

Accordingly, it is possible to widely reduce an amount of the lubricating oil reaching the seal member 29 positioned in an opposite side in the axial direction of the vertical surface 28*a*, it is possible to reduce an amount of the lubricating oil reaching the seal portion of the compressor side, it is possible to secure a seal performance, and it is possible to increase a reliability of a whole of the supercharger.

In this case, it goes without saying that the present invention is not limited to the embodiments mentioned above, but can be modified within the scope of the present invention.

The invention claimed is:

1. A supercharger comprising:
    (a) a turbine shaft having a turbine impeller in one end;
    (b) a compressor impeller rotationally driven by the turbine shaft; and
    (c) a thrust bearing rotatably supporting a thrust force applied to the turbine shaft,
    wherein the thrust bearing is constituted by
        (i) a disc-shaped thrust collar that rotates together with the turbine shaft, and
        (ii) a turbine side thrust bearing and a compressor side thrust bearing arranged to inhibit a movement in an axial direction of the thrust collar, and
    wherein the compressor side thrust bearing has an oil feed flow path feeding a lubricating oil to a surface coming into contact with a thrust collar from an inner side of a housing, an annular concave groove provided in an inner surface of a hollow through hole through which the turbine shaft passes, and an oil discharge flow path dropping down the lubricating oil reserved within the concave groove downward.

2. The supercharger as claimed in claim 1, wherein the supercharger has a fixed partition wall computing between the compressor side thrust bearing and the compressor impeller, and an oil shield member positioned between the fixed partition wall and the compressor side thrust bearing and rotating together with the turbine shaft, and a seal member sealing in a liquid tight manner between the oil shield member and the fixed partition wall, and
    wherein the oil shield member has a vertical surface which is larger than the hollow through hole of the compressor side thrust bearing, and is approximately orthogonal to the turbine shaft.

3. The supercharger as claimed in claim 1, wherein the turbine impeller is integral with the turbine shaft.

* * * * *